US012782739B2

(12) United States Patent
Kobayashi et al.

(10) Patent No.: US 12,782,739 B2
(45) **Date of Patent: *Nov. 3, 2026**

(54) IMAGE CAPTURING AND DISPLAY APPARATUS AND WEARABLE DEVICE

(71) Applicant: CANON KABUSHIKI KAISHA, Tokyo (JP)

(72) Inventors: Masahiro Kobayashi, Tokyo (JP); Takeshi Ichikawa, Hachioji (JP); Akira Okita, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,307

(22) Filed: Oct. 28, 2024

(65) Prior Publication Data

US 2025/0053017 A1 Feb. 13, 2025

Related U.S. Application Data

(63) Continuation of application No. 18/047,608, filed on Oct. 18, 2022, now Pat. No. 12,158,584, which is a (Continued)

(30) Foreign Application Priority Data

Jun. 28, 2019 (JP) ................................ 2019-121951
Apr. 17, 2020 (JP) ................................ 2020-074082

(51) Int. Cl.
*G02B 27/01* (2006.01)

(52) U.S. Cl.
CPC .. *G02B 27/0172* (2013.01); *G02B 2027/0138* (2013.01); *G02B 2027/014* (2013.01); *G02B 2027/0178* (2013.01)

(58) Field of Classification Search
CPC .................................................. G02B 27/0172
See application file for complete search history.

(56) References Cited

U.S. PATENT DOCUMENTS

2011/0249148 A1* 10/2011 Prescher ................ H04N 23/84 348/E9.053
2016/0035139 A1* 2/2016 Fuchs ..................... G06T 7/292 345/633

(Continued)

FOREIGN PATENT DOCUMENTS

JP 2005045777 A 2/2005
JP 2012513694 A 6/2012

(Continued)

*Primary Examiner* — Nan-Ying Yang
(74) *Attorney, Agent, or Firm* — Canon U.S.A., Inc. IP Division

(57) ABSTRACT

An image capturing and display apparatus includes a plurality of image capturing units, a plurality of display units, and a signal processing unit. The plurality of image capturing units includes a first image capturing unit and a second image capturing unit configured to output a signal corresponding to an incident light quantity higher than that of the first image capturing unit. The signal processing unit generates a single third image signal based on a first image signal from the first image capturing unit and a second image signal from the second image capturing unit, and the plurality of display devices displays images based on the third image signal.

24 Claims, 12 Drawing Sheets

Related U.S. Application Data continuation of application No. 17/471,898, filed on Sep. 10, 2021, now Pat. No. 11,520,153, which is a continuation of application No. 16/912,408, filed on Jun. 25, 2020, now Pat. No. 11,137,607.

(56) References Cited

U.S. PATENT DOCUMENTS

| | | | | |
|---|---|---|---|---|
| 2016/0171281 | A1* | 6/2016 | Park | G06F 3/044<br>382/124 |
| 2016/0328882 | A1* | 11/2016 | Lee | G06T 19/006 |
| 2019/0075281 | A1* | 3/2019 | Hall | G01S 7/4814 |
| 2020/0014864 | A1* | 1/2020 | Kang | H04N 25/46 |

FOREIGN PATENT DOCUMENTS

| | | | |
|---|---|---|---|
| JP | 2018190975 | A | 11/2018 |
| WO | 2017183451 | A1 | 10/2017 |

* cited by examiner

IMAGE CAPTURING AND DISPLAY APPARATUS AND WEARABLE DEVICE

CROSS-REFERENCE TO RELATED APPLICATIONS

This application is a continuation of U.S. patent application Ser. No. 18/047,608, filed on Oct. 18, 2022, which is a continuation of Ser. No. 17/471,898, filed on Sep. 10, 2021, issued as U.S. Pat. No. 11,520,153 on Dec. 6, 2022, which is a continuation of U.S. patent application Ser. No. 16/912,408, filed on Jun. 25, 2020, issued as U.S. Pat. No. 11,137,607 on Oct. 5, 2021, which claims the benefit of Japanese Patent Application No. 2019-121951, filed on Jun. 28, 2019, and Japanese Patent Application No. 2020-074082, filed on Apr. 17, 2020, all of which are hereby incorporated by reference herein in their entirety.

BACKGROUND

Field of the Disclosure

The present disclosure relates to an image capturing and display apparatus and a wearable device.

Description of the Related Art

In these days, wearable devices called a head mount display (hereinafter referred to as an HMD) and smart glasses are known. Japanese Patent Application Laid-Open No. 2018-060980 discusses an image capturing and display apparatus that includes a plurality of photoelectric conversion elements that convert light incident from the outside of the image capturing and display apparatus into an electric charge signal, and a plurality of light-emitting elements that emit light of an intensity corresponding to the electric charge signal obtained from the plurality of photoelectric conversion element.

The brightness in the outside world has a wide range of brightness levels from high brightness to low brightness. Japanese Patent Application Laid-Open No. 2018-060980 fails to study details about displaying an image that does not give a feeling of strangeness to a viewer for a wide brightness range in the outside world. Accordingly, the present disclosure is directed to an image capturing and display apparatus capable of displaying a favorable image corresponding to a wide brightness range in the outside world.

SUMMARY

According to an aspect of the present disclosure, an image capturing and display apparatus includes a plurality of image capturing units, a plurality of display units, and a signal processing unit, wherein the plurality of image capturing units includes a first image capturing unit configured to acquire an image signal in a first light quantity range, and a second image capturing unit configured to acquire an image signal in a second light quantity range that includes a light quantity higher than that in the first light quantity range, wherein the signal processing unit generates a single third image signal based on a first image signal from the first image capturing unit and a second image signal from the second image capturing unit, and wherein the plurality of display devices displays images based on the third image signal.

Further features of the present disclosure will become apparent from the following description of exemplary embodiments with reference to the attached drawings.

DESCRIPTION OF THE EMBODIMENTS

Figure 1A:
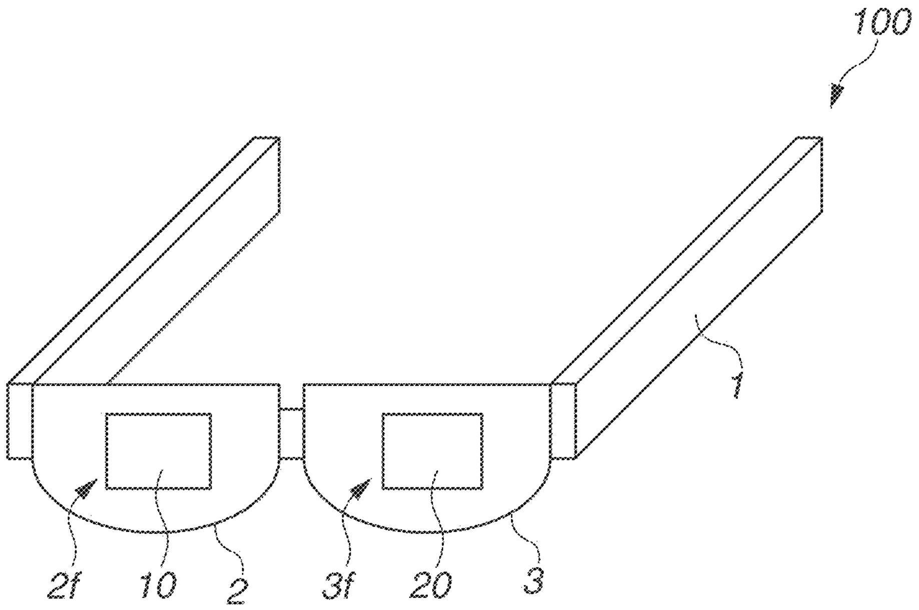
FIGS. 1A and 1B are external views illustrating an image capturing and display apparatus according to a first exemplary embodiment.

An example of an image capturing and display apparatus according to exemplary embodiments of the present disclosure will be described below with reference to the accompanying drawings. Similar elements are denoted by the same reference numerals throughout various exemplary embodiments, and redundant descriptions thereof are omitted. Exemplary embodiments to be described below can be appropriately modified or combined. The image capturing and display apparatus according to the exemplary embodiments of the present disclosure is applicable to, for example, a wearable device such as smart glasses, a head mount display (HMD), and a smart contact lens.

Figure 1B:
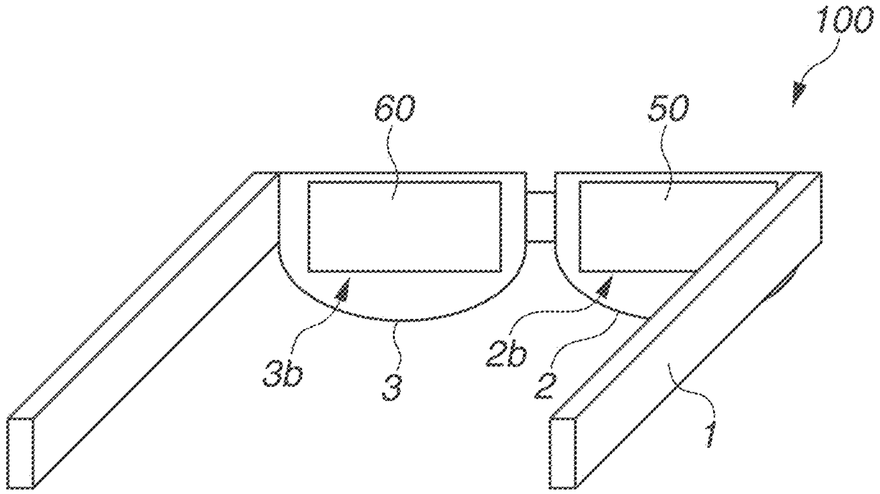

An image capturing and display apparatus according to a first exemplary embodiment will be described below with reference to FIGS. 1A to 4. FIGS. 1A and 1B are external views illustrating a wearable device including an image capturing and display apparatus 100 according to the first exemplary embodiment. The wearable device includes a casing 1. The casing 1 includes a lens 2, a lens 3, and the image capturing and display apparatus 100. The image capturing and display apparatus 100 includes a plurality of image capturing units and a plurality of display units. The plurality of image capturing units includes at least an image capturing unit 10 and an image capturing unit 20. The plurality of display units includes at least a display unit 50 and a display unit 60. The casing 1 includes rims and temples for glasses, and accommodates a signal processing unit, a control unit, and a communication unit. The lens 2 is provided with the image capturing unit 10 and the display unit 50, and the lens 3 is provided with the image capturing unit 20 and the display unit 60. The image capturing unit 10 is provided on a front surface 2*f* of the lens 2, and the display unit 50 is provided on a back surface 2*b* of the lens 2. The image capturing unit 20 is provided on a front surface 3*f* of the lens 3, and the display unit 60 is provided on a back surface 3*b* of the lens 3.

A layout relationship between the image capturing unit 10 and the lens 2 will now be described. The image capturing unit 10 is provided on the front surface 2*f* of the lens 2. The front surface 2*f* of the lens 2 and the front surface of the image capturing unit 10 may not form a flat surface. The image capturing unit 10 may be embedded in the lens 2. The front surface 2*f* of the lens 2 and the front surface of the image capturing unit 10 may form a single curved surface or planar surface. A layout relationship between the image capturing unit 20 and the lens 3 is similar to the layout relationship between the image capturing unit 10 and the lens 2. A layout relationship between the display unit 50 and the lens 2 is also similar to the layout relationship between the image capturing unit 10 and the lens 2, and a layout relationship between the display unit 60 and the lens 3 is also similar to the layout relationship between the image capturing unit 10 and the lens 2.

Figure 2:
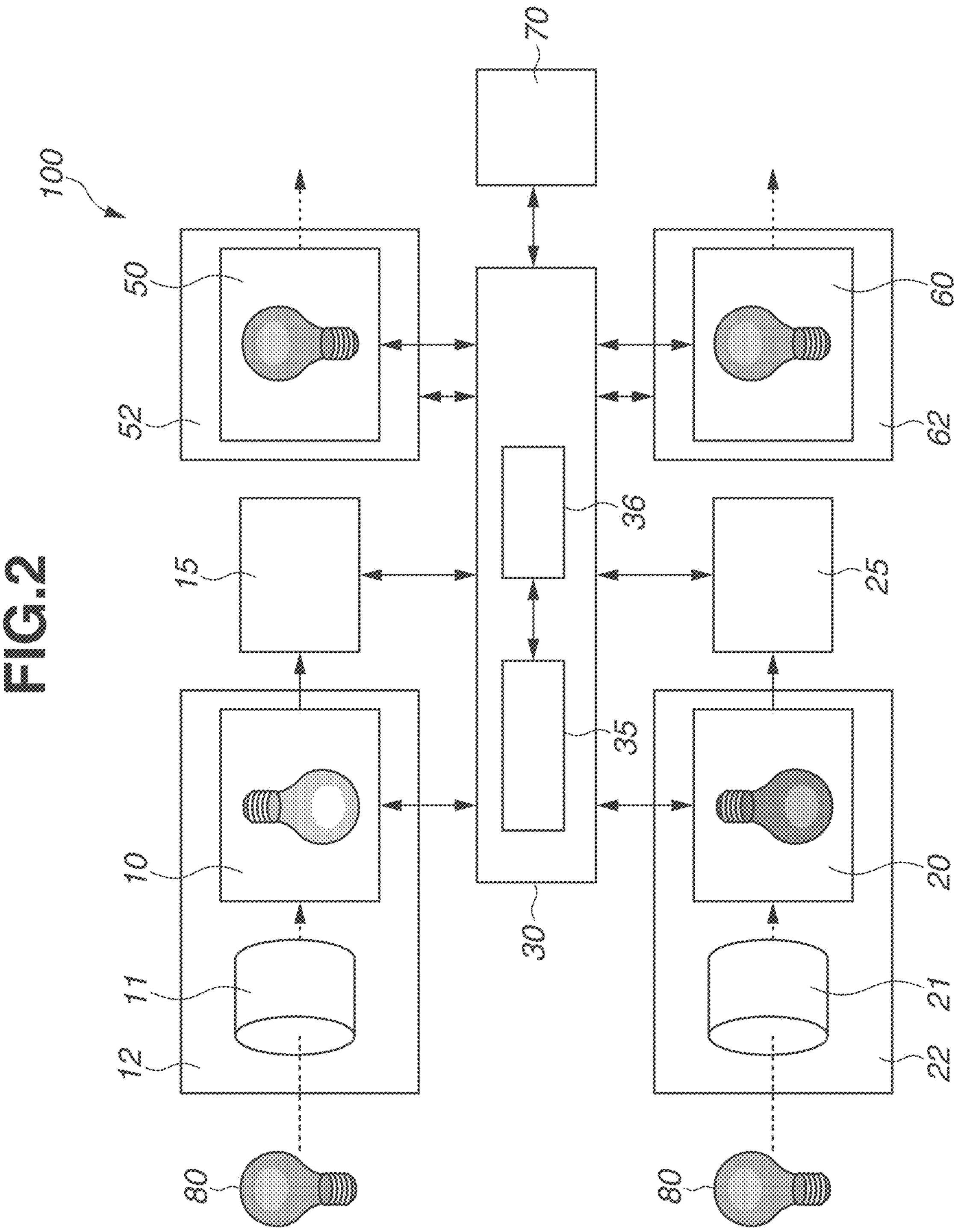
FIG. 2 is a block diagram illustrating the image capturing and display apparatus according to the first exemplary embodiment.

FIG. 2 is a block diagram illustrating the image capturing and display apparatus 100 according to the present exemplary embodiment. The image capturing and display apparatus 100 includes the image capturing unit 10, an image capturing signal processing unit 15, the image capturing unit 20, an image capturing signal processing unit 25, a signal processing unit 30, the display unit 50, the display unit 60, and an input unit 70.

A lens unit 11 includes a lens for condensing light from a subject on the image capturing unit 10, and optical mechanisms for focusing and for changing an imaging magnification, and an aperture for changing a light quantity, and is driven based on a control signal from the signal processing unit 30. The image capturing unit 10 is a complementary metal oxide semiconductor (CMOS) image sensor, and outputs an image signal based on a control signal from the signal processing unit 30. The lens unit 11 and the image capturing unit 10 constitute an image capturing system 12. The image capturing signal processing unit 15 performs image processing, such as color correction processing, white balance correction, and optical shading correction, on the image signal from the image capturing unit 10 under the control of the signal processing unit 30, and then outputs the image signal and a control signal to the signal processing unit 30.

A lens unit 21 includes a lens for condensing light from a subject on the image capturing unit 20, and optical mechanisms for focusing and for changing an imaging magnification, and an aperture for changing a light quantity, and is driven based on a control signal from the signal processing unit 30. The image capturing unit 20 is a CMOS image sensor, and outputs an image signal based on a control signal from the signal processing unit 30. The lens unit 21 and the image capturing unit 20 constitute an image capturing system 22. The image capturing signal processing unit 25 performs image processing, such as color correction processing, white balance correction, and optical shading correction, on the image signal from the image capturing unit 20 under the control of the signal processing unit 30, and then outputs the image signal and a control signal to the signal processing unit 30.

The signal processing unit 30 comprehensively controls each unit of the image capturing and display apparatus 100 and performs image processing. The signal processing unit 30 is a microcontroller including a signal processing circuit 35 and a signal holding circuit 36. The signal holding circuit 36 is, for example, a nonvolatile memory or a volatile memory. The signal holding circuit 36 holds the image signals and control signals output from the image capturing signal processing unit 15 and the image capturing signal processing unit 25. The signal processing unit 30 performs image processing based on the image signals obtained from the image capturing unit 10 and the image capturing unit 20, and generates a display image signal. The signal processing unit 30 can determine a control signal for each unit based on the image processing result.

The display unit 50 displays the image signal supplied from the signal processing unit 30. Any type of display, such as a liquid crystal display, a projection display, or an organic light-emitting display, can be used as the display unit 50. A display system 52 includes the display unit 50 and an interface circuit (not illustrated). The display unit 60 displays the image signal supplied from the signal processing unit 30. Any type of display, such as a liquid crystal display, a projection display, or an organic light-emitting display, can be used as the display unit 60. A display system 62 includes the display unit 60 and an interface circuit (not illustrated).

The input unit 70 include, for example, a power supply button, various operation keys, buttons, and dials used for display brightness adjustment and zoom adjustment. The input unit 70 outputs a control signal to the signal processing unit 30 in response to an input operation performed by a user. The input unit 70 is not limited to physical components such as operation keys. For example, the input unit 70 may be operated by providing an image capturing unit and various detection units to perform an operation such as a gesture input operation, an operator's line-of-sight detection input operation, or an audio input operation.

Figure 3A:
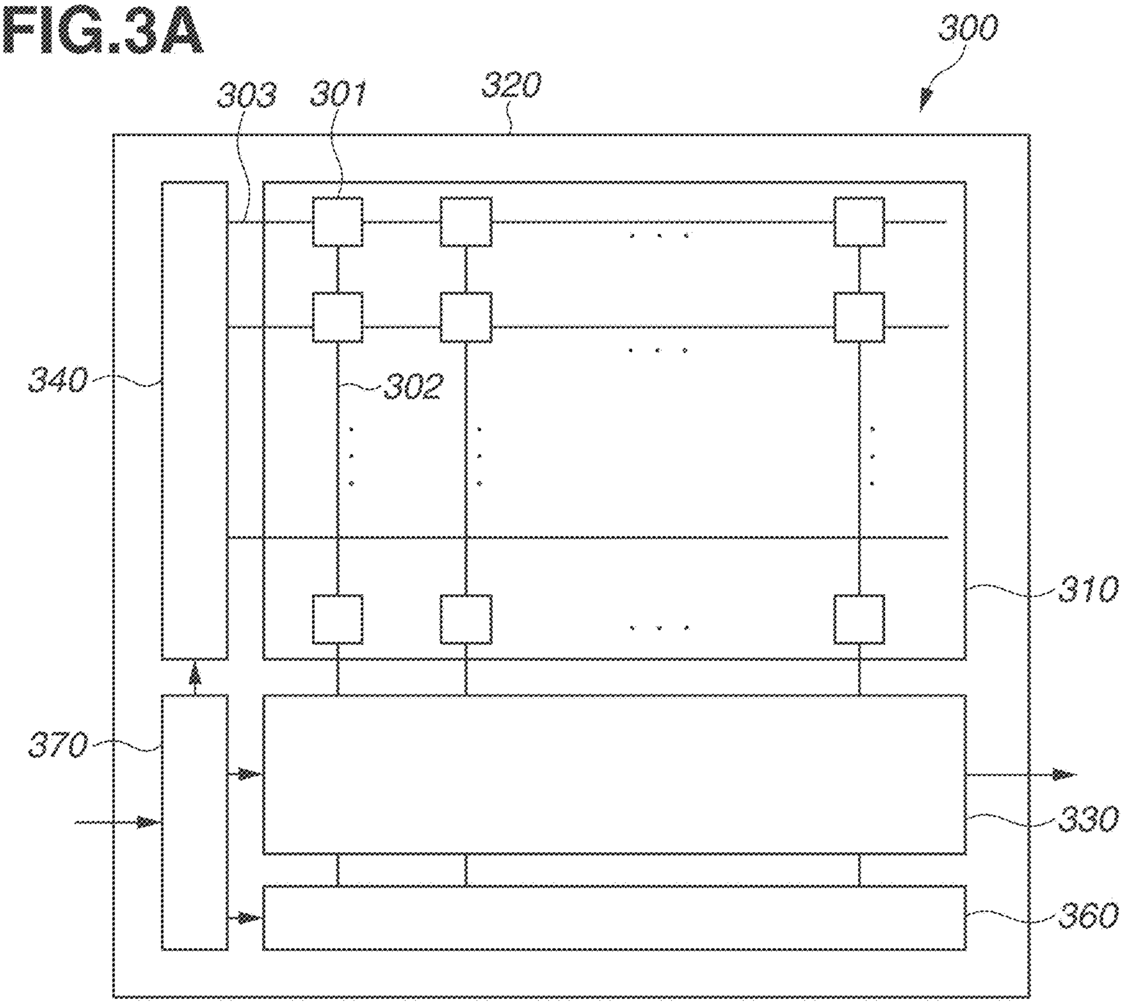
FIG. 3A is a block diagram illustrating an image capturing unit of the image capturing and display apparatus according to the first exemplary embodiment.

Next, the image capturing unit 10 and the image capturing unit 20 will be described with reference to FIGS. 3A and 3B. In the present exemplary embodiment, assume that each of the image capturing unit 10 and the image capturing unit 20 is a CMOS image sensor 300. FIG. 3A is a block diagram illustrating the image sensor 300. The image sensor 300 includes a unit cell region 310 and the other region 320. The unit cell region 310 is a region in which a plurality of unit cells 301 is arranged in a matrix shape. The other region 320 is the region other than the unit cell region 310. In the other region 320, a read-out circuit 330, a vertical scanning circuit 340, a horizontal scanning circuit 360, and a timing control circuit 370 are arranged.

Each of the plurality of unit cells 301 is provided with any one of color filters, i.e., red (R), green (G), and blue (B) filters, arranged, for example, in a Bayer array. The number of unit cells 301 corresponding to a single color filter is not limited to one. The color filter array is not limited to the Bayer array. In the unit cell region 310, column signal lines 302 and row signal lines 303 are arranged. At least one of the column signal lines 302 is provided corresponding to each column of the plurality of unit cells 301 arranged in an array. The column signal line 302 is provided to read out signals obtained from the unit cells 301. Each column signal line 302 is electrically connected to the read-out circuit 330 disposed in the other region 320. Each row signal line 303 is electrically connected to the vertical scanning circuit 340. A control signal output from the vertical scanning circuit 340 enables elements of each unit cell 301 to operate and read out the signal obtained from the unit cell 301. While FIG. 3A illustrates only one row signal line 303, the configuration of each row signal line 303 will be described in detail with reference to FIG. 3B.

The read-out circuit 330 includes an amplifier circuit, a correlated double sampling circuit (hereinafter, referred to as a CDS circuit), and an analog-to-digital conversion circuit (hereinafter, referred to as an ADC circuit). The read-out circuit 330 may include a single read-out circuit portion for each column signal line 302. A single read-out circuit portion may be composed of the above-described amplifier circuit or the like. In the present exemplary embodiment, assume that the read-out circuit 330 includes a plurality of ADC circuits. A digital signal generated by the read-out circuit 330 is output to the outside of the image sensor 300 by the horizontal scanning circuit 360. The timing control circuit 370 generates a timing control signal based on the control signal from the signal processing unit 30 illustrated in FIG. 2. Operations performed by the vertical scanning circuit 340, the horizontal scanning circuit 360, the read-out circuit 330, and the like are controlled by the control signal output from the timing control circuit 370.

Figure 3B:
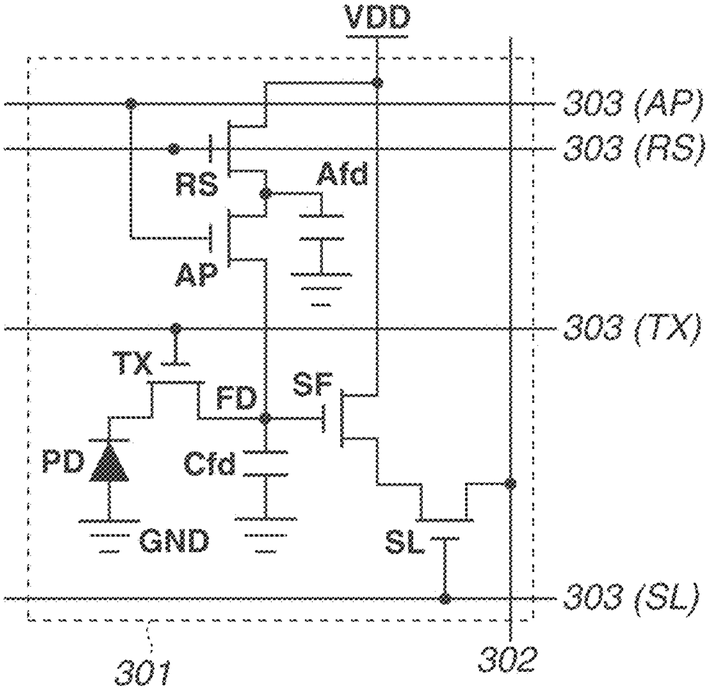
FIG. 3B is a circuit diagram illustrating a unit cell of the image capturing unit of the image capturing and display apparatus according to the first exemplary embodiment.

FIG. 3B is a circuit diagram illustrating a unit cell 301 of the image sensor 300 illustrated in FIG. 3A. The unit cell 301 includes a photodiode PD, which functions as a photoelectric conversion element, a transfer transistor TX, an amplification transistor SF, a selection transistor SL, a reset transistor RS, and an additional capacitor transistor AP. In the present exemplary embodiment, assume that each of the transistors is a switch element composed of an n-channel metal-oxide-semiconductor field-effect transistor (MOSFET). However, the conductivity type of each transistor and the structure of each transistor are not particularly limited.

The gate of the transfer transistor TX is connected to the row signal line 303 (TX). The gate of the selection transistor SL is connected to the row signal line 303 (SL). The gate of the reset transistor RS is connected to the row signal line 303 (RS). The gate of the additional capacitor transistor AP is electrically connected to the row signal line 303 (AP). These row signal lines 303 extend in a horizontal direction and are capable of simultaneously driving the unit cells 301 included in the same row. This configuration makes it possible to perform an operation of a sequential line operation type rolling shutter or a simultaneous all row operation type global shutter.

The photodiode PD performs photoelectric conversion and accumulates generated signal electric charge. When the transfer transistor TX is turned on, the signal electric charge accumulated in the photodiode PD is transferred to a floating diffusion region FD, and accumulated therein. The drain of the amplification transistor SF is electrically connected to a power supply voltage VDD, and the gate of the amplification transistor SF is electrically connected to the floating diffusion region FD. The amplification transistor SF constitutes a source follower circuit and a node corresponding to the gate of the amplification transistor SF is also referred to as an input node for the source follower circuit. The amplification transistor SF outputs a signal based on the signal electric charge held in the floating diffusion region FD. The drain of the selection transistor SL is electrically connected to the source of the amplification transistor SF. The source of the selection transistor SL is electrically connected to the column signal line 302. The selection transistor SL can select the unit cell 301 from which a signal is read out. When the selection transistor SL is turned on, the amplification transistor SF and a constant current source (not illustrated) constitute a source follower, and the signal corresponding to the signal electric charge held in the floating diffusion region FD is output to the column signal line 302.

The drain of the reset transistor RS is electrically connected to the power supply voltage VDD, and the source of the reset transistor RS is electrically connected to the drain of the additional capacitor transistor AP. The drain of the additional capacitor transistor AP is electrically connected to the source of the reset transistor RS, and the source of the additional capacitor transistor AP is electrically connected to the floating diffusion region FD. When the transfer transistor TX, the additional capacitor transistor AP, and the reset transistor RS are simultaneously turned on, the floating diffusion region FD and the photodiode PD are set to a predetermined voltage based on the power supply voltage VDD. An operation for setting the floating diffusion region FD and the photodiode PD to the predetermined voltage is also referred to as a reset operation.

The image capturing unit 10 and the image capturing unit 20 will now be described. The image capturing unit 20 can deal with a light quantity range including a light quantity higher than the light quantity range of the image capturing unit 10. The image capturing unit 10 supports a first light quantity range, and the image capturing unit 20 supports a second light quantity range. That is, the image capturing unit 10 is configured to acquire an image signal in a first light quantity range, and the image capturing unit 20 is configured to acquire an image signal in a second light quantity range The second light quantity range includes light quantity values higher than the first light quantity range. The light quantity range supported refers to a light quantity range in which the linearity of an output signal with respect to the quantity of input light is maintained. The supported light quantity range may indicate a light quantity range defined by the quantity of light corresponding to a maximum output signal of each image capturing unit and the quantity of light corresponding to a minimum output signal of each image capturing unit.

As a method for changing the supported light quantity range, a method of changing a conversion gain may be used. In this case, the conversion gain for the image capturing unit 10 is higher than the conversion gain for the image capturing unit 20. The conversion gain described herein represents a magnitude relationship between signal values obtained for a predetermined light quantity. More specifically, when the quantity of incident light is large, output of the image capturing unit 10 having a high conversion gain is saturated, and thus the image capturing unit 10 cannot output a signal. However, when the quantity of incident light is small, the image capturing unit 10 can output a multi-tone signal with a high accuracy. On the other hand, the image capturing unit 20 having a low conversion gain can output a signal even when the quantity of incident light is large. As a method for changing the magnitude of the conversion gain, for example, a method of switching a capacitance value of a floating diffusion capacitor, a method of switching a gain of an amplifier on a signal path, and a combination thereof can be used. In the present exemplary embodiment, the method of switching the capacitance value of the floating diffusion capacitor is described in detail.

A capacitance of the floating diffusion region FD is represented by Cfd, and a capacitance that can be added by the additional capacitor transistor AP is represented by Afd. When the reset transistor RS is in an OFF state, the floating diffusion region FD has a following capacitance value (FD capacitance value). When the additional capacitor transistor AP is in an ON state, the FD capacitance value corresponds to the sum of the value of the capacitance Cfd and the value of the capacitance Afd. When the additional capacitor transistor AP is in the OFF state, the FD capacitance value corresponds to the value of the capacitance Cfd. FIG. 3B simply illustrates the capacitance Cfd and the capacitance Afd, including a parasitic capacitance and the like that need to be taken into consideration when designed. Since the capacitance value of the floating diffusion region FD can be switched, a photoelectric conversion gain, i.e., sensitivity, can be switched. This is because, as described above, the signal electric charge transferred to the floating diffusion region FD by the transfer transistor TX is converted into a voltage signal when it is output from the amplification transistor SF.

According to the present exemplary embodiment, the capacitance of the floating diffusion region FD in the image capturing unit 10 illustrated in FIG. 2 is formed only of the capacitance Cfd, and the capacitance of the floating diffusion region FD in the image capturing unit 20 illustrated in FIG. 2 corresponds to the sum of the capacitance Cfd and the capacitance Afd. The additional capacitor transistor AP illustrated in FIG. 3B can be switched between the ON state and the OFF state. However, in the case of using the image sensor 300 as the image capturing unit 20, a configuration in which the additional capacitor transistor AP is constantly in the ON state, i.e., a configuration in which the power supply voltage VDD is electrically connected to the gate of the additional capacitor transistor AP may be employed. In the case of using the image sensor 300 as the image capturing unit 20, a large capacitance CAfd, which is obtained by adding the capacitance AfD to the capacitance Cfd, may be used without providing the additional capacitor transistor AP.

In the image capturing and display apparatus 100 illustrated in FIGS. 1A, 1B, and 2, the signal processing unit 30 performs image processing based on image signals acquired by the image capturing unit 10 and the image capturing unit 20, and the display unit 50 and the display unit 60 display an image based on the processed image signals. Accordingly, in order to display an image that does not give a feeling of strangeness to the user, it is desirable for the image capturing unit 10 and the image capturing unit 20 to acquire favorable image signals. It is important to acquire, for example, image signals with a wide dynamic range as favorable image signals. If a display image is generated based on image signals with a narrow dynamic range, the user may experience a feeling of strangeness in a situation different from that seen with the eyes of the user, such as a situation where the user feels excessive stimulus of brightness, or a situation where the user cannot recognize the image in which blown out highlights occur in a bright portion and blocked up shadows occur in a dark portion. Accordingly, in the image capturing and display apparatus 100 according to the present exemplary embodiment, a display image is generated based on image signals acquired by the image capturing unit 10 and the image capturing unit 20 which have different sensitivities.

Figure 4:
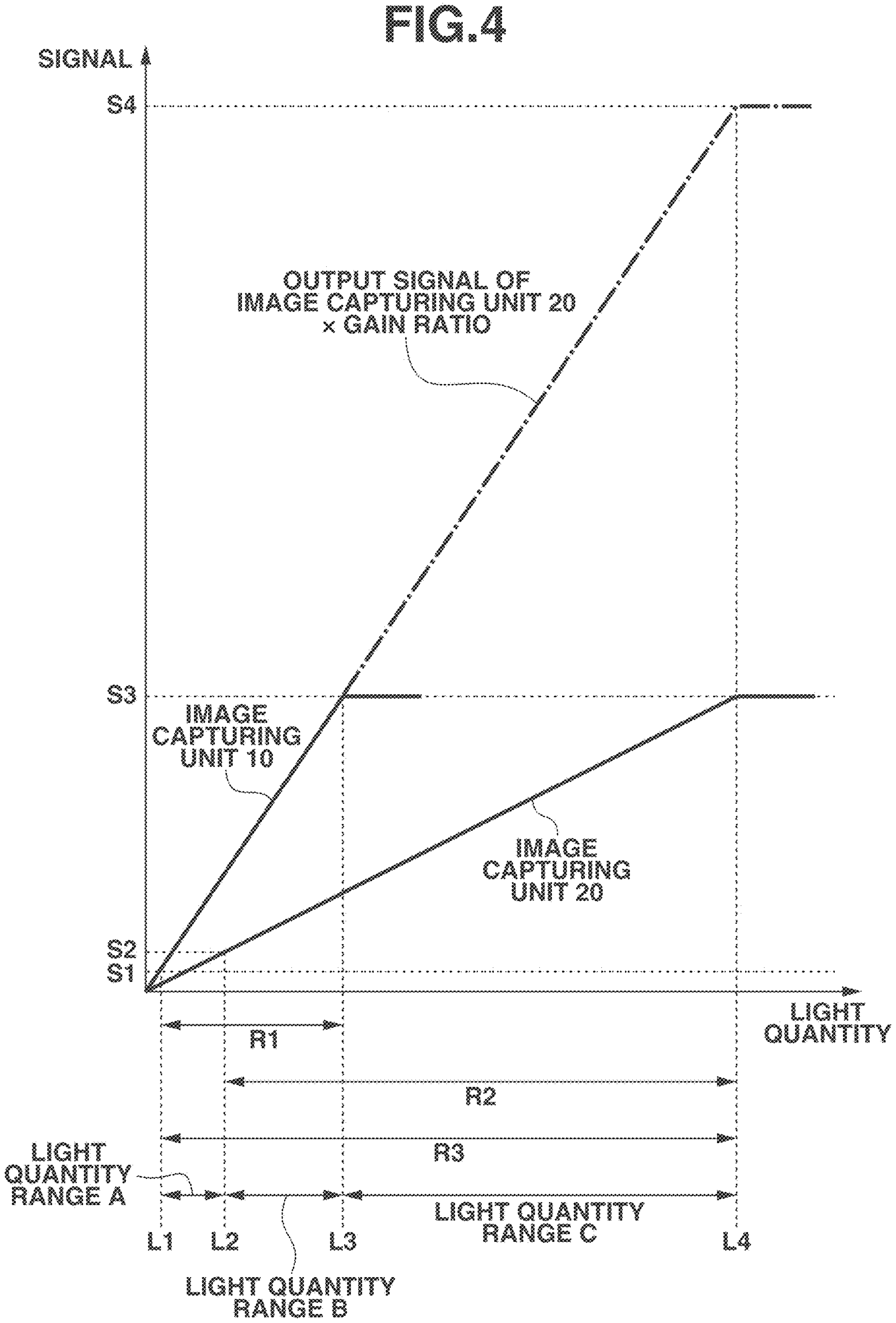
FIG. 4 is a conceptual diagram illustrating image signals output from each image capturing unit in the image capturing and display apparatus according to the first exemplary embodiment.

FIG. 4 is a conceptual diagram illustrating image signals output from each image capturing unit in the image capturing and display apparatus 100. A horizontal axis in the conceptual diagram illustrated in FIG. 4 represents the quantity of light incident on the image sensor 300, and a vertical axis in the conceptual diagram illustrated in FIG. 4 represents the magnitude of signals output from the image sensor 300. As described above, a conversion gain G1 of the image capturing unit 10 is higher than a conversion gain G2 of the image capturing unit 20. In this case, in order to reduce the conversion gain G2, the additional capacitor transistor AP illustrated in FIG. 3B may be turned on to increase the FD capacitance value of each unit cell 301 in the image capturing unit 20 to Afd+Cfd. A relational expression where an electric charge amount is represented by Q, a capacitance value is represented by C, and a voltage value is represented by V is represented by Q=CV. In other words, in the floating diffusion region FD of each unit cell 301 in the image capturing unit 10, a potential variation larger than that in the floating diffusion region FD of each unit cell 301 in the image capturing unit 20 may occur for the same light quantity (i.e., the same electric charge amount). Accordingly, assuming that a noise level on a read-out path for the read-out circuit 330 and subsequent circuits is maintained at the same level, an amount of signal S1, which indicates the noise level of the entire image capturing unit 10, is smaller than an amount of signal S2, which indicates the noise level of the entire image capturing unit 20. In other words, in a light quantity range A of smaller light quantities, the image quality of the image capturing unit 10 is higher than the image quality of the image capturing unit 20. On the other hand, the light quantity (saturation light quantity) that reaches an amount of light quantity corresponding to a signal S3, which is a saturation level of the image capturing unit, is set to a light quantity L3 of the image capturing unit 10. The light quantity L3 is smaller than a light quantity L4 of the image capturing unit 20. Therefore, in a light quantity range C of larger light quantities, the image quality of the image capturing unit 20 is higher than the image quality of the image capturing unit 10. In a light quantity range B of intermediate light quantities, an excellent image quality can be obtained in each of the image capturing unit 10 and the image capturing unit 20.

An example of image processing performed by the signal processing unit 30 illustrated in FIG. 2 is dynamic range expansion processing (hereinafter, referred to as HDR processing). In the HDR processing, an image signal with a wide dynamic range is generated using a plurality of image signals acquired under a plurality of image capturing conditions with different light quantity ranges. The light quantity range in which the image capturing unit 10 can acquire image signals corresponds to a light quantity range R1, and the light quantity range in which the image capturing unit 20 can acquire image signals corresponds to a light quantity range R2. By combining a plurality of image signals in different light quantity ranges described above, an image signal corresponding to a light quantity range R3, including light quantities L1 to LA, can be generated.

In the HDR processing, a step may occur in a signal-noise ratio when the image signals are switched. Accordingly, a plurality of image signals may be combined in the light quantity range B in which each of the plurality of image capturing units can acquire an image signal. In this case, signal processing, such as processing for combining image signals from two image capturing units at a ratio of, for example, $\alpha:(1-\alpha)$, can be performed. In this case, $\alpha$ takes a value that is more than or equal to “0” and less than or equal to “1”. In the present exemplary embodiment, $\alpha$ is not limited to a constant value, and may be varied within the light quantity range B. For example, $\alpha$ may be varied in such a manner that $\alpha$ is set to a value greater than 0.5 in a range closer to the light quantity range A, and $\alpha$ is set to a value smaller than 0.5 in a range closer to the light quantity range C so as to prevent the generation of an image after the HDR processing that gives a feeling of strangeness to the user.

In a case of acquiring image signals using a plurality of image capturing units, a small difference, such as a variation in brightness, a variation in tint, or a difference in white balance, may give a feeling of strangeness to the user. Correction processing may be performed by the signal processing unit 30 using signals in the light quantity range B in which the plurality of image capturing units can acquire image signals.

If a favorable image can be obtained using only the image signal from one of the plurality of image capturing units, for example, in the light quantity range A or the light quantity range C, signal reading processing is temporarily interrupted in the same region of the other one of the plurality of image capturing units, thereby making it possible to save power.

An image with a wide dynamic range can be obtained by the signal processing unit 30 performing appropriate processing on the image signals acquired by the plurality of image capturing units with different conversion gains. In this way, the image capturing and display apparatus according to the present exemplary embodiment is capable of displaying a favorable image, which does not include blocked up shadows or blown out highlights and does not give a feeling of strangeness to the user, on the plurality of display units.

As described above, the method for switching the conversion gain is not limited to the method of switching the capacitance value of the floating diffusion capacitor. Each of the image capturing unit 10 and the image capturing unit 20 may include an amplifier that amplifies a signal from each unit cell 301. In this case, the amplifier that amplifies a signal from each unit cell 301 in the image capturing unit 10 has a gain higher than that of the amplifier that amplifies a signal from each unit cell 301 in the image capturing unit 20. This configuration makes it possible to change the conversion gain.

An image capturing and display apparatus according to a second exemplary embodiment differs from the image capturing and display apparatus according to the first exemplary embodiment in that a single photon avalanche diode (SPAD) image sensor is used for the image capturing unit 10 according to the first exemplary embodiment, instead of using a CMOS image sensor. Descriptions of the contents described in the first exemplary embodiment will be omitted in the following description.

Figure 5:
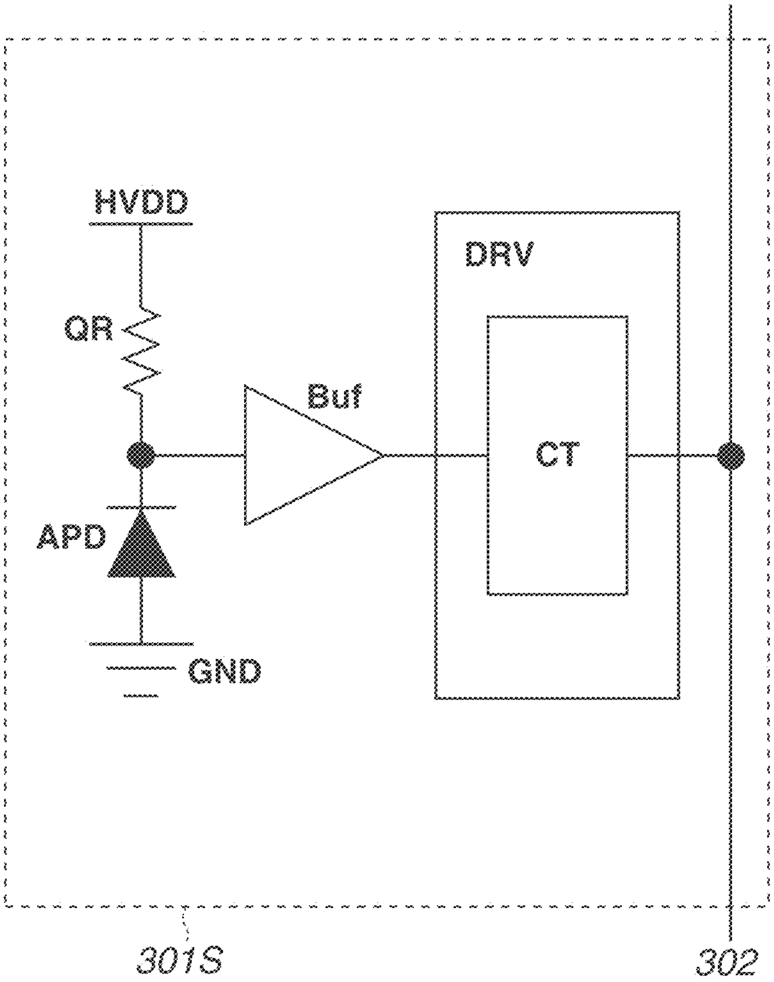
FIG. 5 is a circuit diagram illustrating a unit cell of an image capturing unit of an image capturing and display apparatus according to a second exemplary embodiment.

FIG. 5 is a circuit diagram illustrating a unit cell 301S included in the image capturing unit 10. The unit cell 301S includes an avalanche photodiode APD, a quench resistor QR, a buffer Buf, a control unit DRV, and a counter CT. A reverse bias voltage by a potential HVDD is applied to the avalanche photodiode APD through the quench resistor QR. In this case, the potential HVDD is set so as to apply a voltage more than or equal to a breakdown voltage to drive the avalanche photodiode APD in a Geiger mode. An output from the buffer Buf is input to the counter CT in the control unit DRV. Image signals counted by the counter CT are read out to the column signal line 302. The read-out circuit 330 and the like on the column signal line 302 and subsequent signal lines can be operated by appropriately changing the configuration illustrated in FIG. 3A.

Figure 6A:
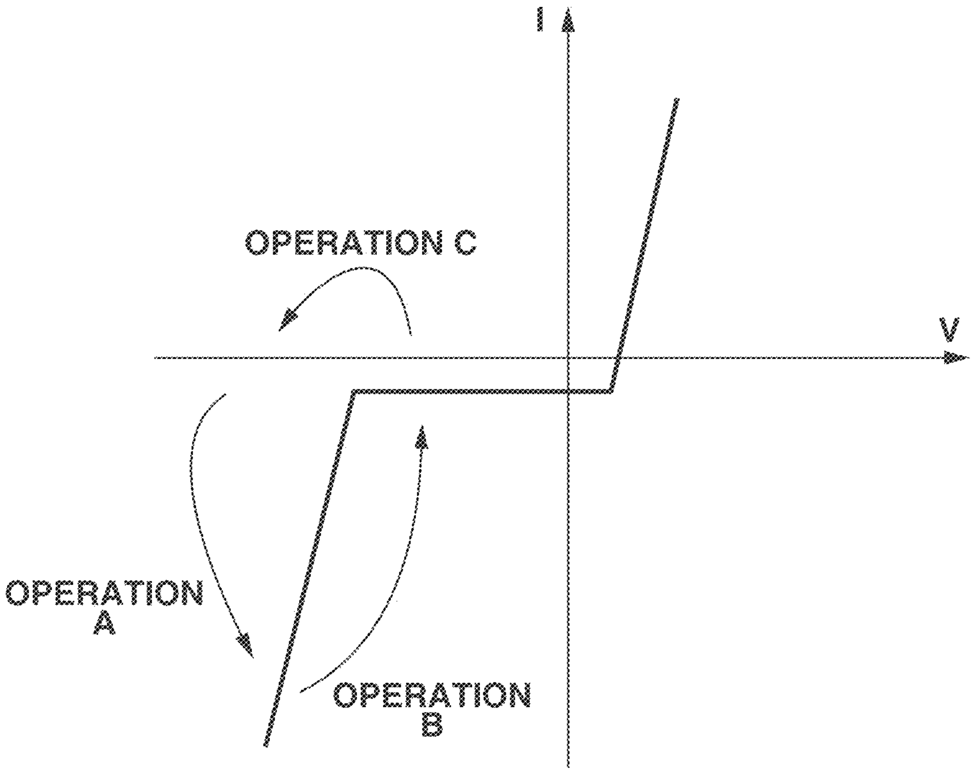
FIGS. 6A and 6B are conceptual diagrams illustrating an operation performed by the image capturing and display apparatus according to the second exemplary embodiment.

An operation performed by the unit cell 301S when photons are incident will now be briefly described with reference to FIGS. 6A and 6B. FIG. 6A illustrates current-voltage characteristics (I-V characteristics) of the avalanche photodiode APD. As described above, the avalanche photodiode APD is operated in the Geiger mode. In this case, when photons are incident on the avalanche photodiode APD, a large current (photoelectric current) caused by an avalanche amplification flows (operation A). At the same time when the current flows, the reverse bias voltage drops with the quench resistor QR and the reverse bias voltage to be applied to the avalanche photodiode APD becomes less than the breakdown voltage, so that the avalanche amplification is stopped (operation B). When the avalanche amplification is stopped, the cathode of the avalanche photodiode APD is charged with the potential HVDD again, and the mode returns to the Geiger mode (operation C). A variation in the voltage at a buffer input end during operations A to C is subjected to pulse shaping by the buffer Buf, and the signals are counted by the counter CT. By repeating this processing, the number of photons incident on the avalanche photodiode APD can be measured.

Figure 6B:
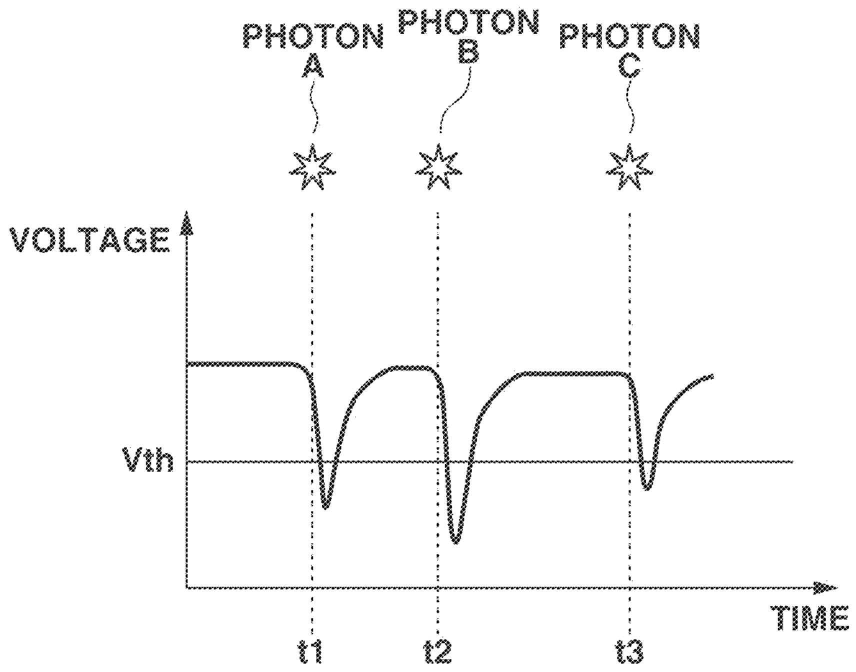

FIG. 6B is a graph in which the horizontal axis represents time and which schematically illustrates a relationship between a determination threshold Vth for determining photons to be incident and a pulse waveform of an output voltage that is generated by the avalanche amplification and output from the avalanche photodiode APD when photons are incident. In the present exemplary embodiment, assume that the avalanche photodiode APD is supplied with the potential HVDD. In this case, a photon A (time t1), a photon B (time t2), and a photon C (time t3), which are incident on the avalanche photodiode APD, cause the avalanche amplification to such an extent that a pulse waveform which varies to an extent that exceeds the determination threshold Vth of the counter CT is output. The number of photons incident on the avalanche photodiode APD can be measured by counting pulse waveforms.

The image capturing unit 10 includes the unit cell 301S illustrated in FIG. 5, and the image capturing unit 20 includes the unit cell 301 illustrated in FIG. 3B. In this case, the configuration of the image capturing unit 20 can be appropriately changed. The image capturing unit 20 may only need to be a CMOS image sensor. For example, the FD capacitance value of the unit cell 301 illustrated in FIG. 3B may be formed only of the capacitance Cfd, and the additional capacitor transistor AP may be omitted. Unlike the unit cell 301, the unit cell 301S does not use the reset transistor RS and the amplification transistor SF. Accordingly, in the image capturing unit 10, reset noise (kTC noise), random telegraph signal (RTS) noise, or the like, which is caused by each transistor, does not occur, and the signal-noise ratio (S/N ratio) is more excellent than that in the image capturing unit 20. Accordingly, the image capturing unit 10 is excellent in image capturing of a still image in which the influence of random noise on the image quality is large.

Figure 7A:
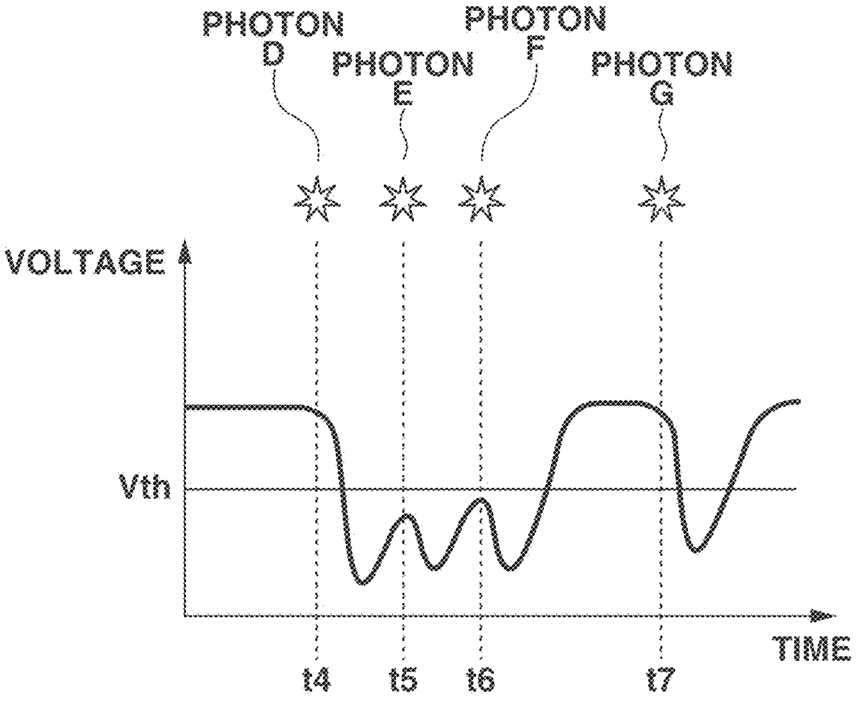
FIGS. 7A and 7B are conceptual diagrams illustrating an operation performed by the image capturing and display apparatus according to the second exemplary embodiment.
Figure 7B:
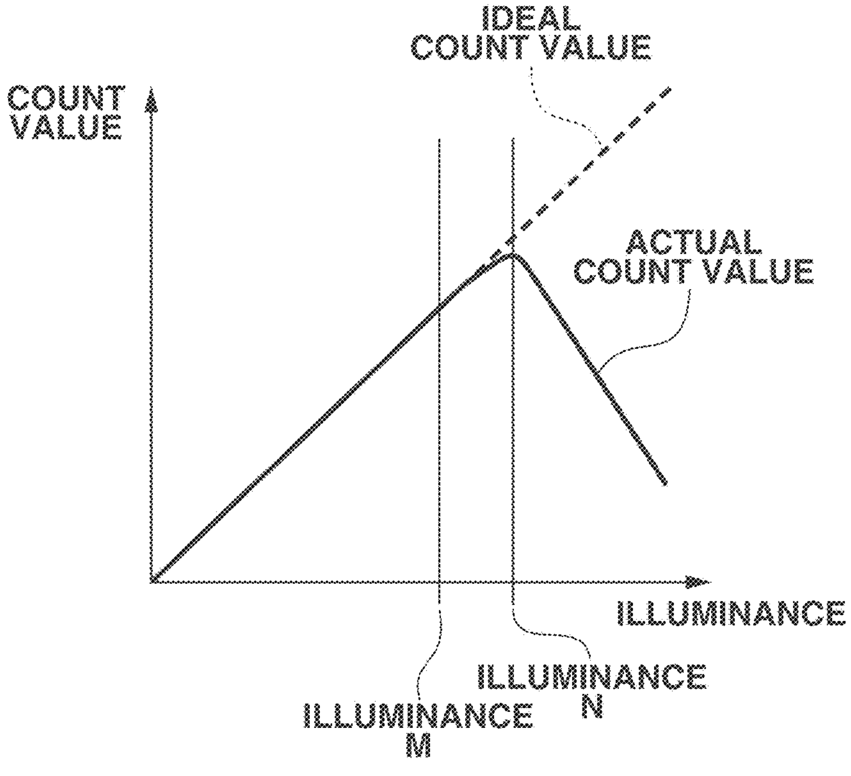

In the image capturing unit 10 composed of an SPAD image sensor, an image signal with a high image quality can be acquired at a high conversion gain even in a low-illuminance state with a small number of incident photons. However, in a high-illuminance state with a large number of incident photons, a problem called a count error may occur. FIGS. 7A and 7B are graphs each illustrating an example where a count error occurs in the SPAD image sensor. FIG. 7A is a graph in which the horizontal axis represents time and which schematically illustrates a relationship between the determination threshold Vth and a pulse waveform of an output voltage generated due to avalanche amplification when photons are incident. Unlike the movement illustrated in FIG. 6B, after the voltage that varies due to a photon D (time t4) to an extent that exceeds the determination threshold Vth is input, a photon E (time t5) is incident before the avalanche amplification operation in the operation B illustrated in FIG. 6A is stopped. In this case, the photon E is incident at time t5 before a variation in waveform due to the avalanche amplification that has occurred at time t4 exceeds the determination threshold Vth, and thus the count operation cannot be performed on the photon E. A state where a photon F (time t6) is incident is similar to a state during time t4 to time t5, and thus the count operation is not performed on the photon F. In this way, when the brightness of the subject is high, photons are continuously incident before the variation in wavelength exceeds the determination threshold Vth. Thus, the count value is smaller than the actual number of incident photons, so that a count error (count saturation) occurs. During a period from time t6 to time t7, no photons are incident and the voltage temporarily exceeds the determination threshold Vth. Accordingly, pulse waveforms of a voltage corresponding to a photon G (time t7) to be subsequently incident are counted.

FIG. 7B is a graph illustrating a relationship between the illuminance in the SPAD image sensor and the count value. The number of photons increases as the illuminance increases, and the count value obtained in the count operation by the SPAD image sensor also increases in proportion to the obtained count value. However, if the illuminance reaches an illuminance M or more, a state during a period from time t4 to time t6 illustrated in FIG. 7A occurs and a count error (count saturation) occurs. When the illuminance further increases, the number of photons to be incident further increases at the same time, and thus the count error state continues. Accordingly, an actual count value (solid line) is inversely proportional to an ideal count value (dashed line) after the illuminance reaches an illuminance N.

Figure 8:
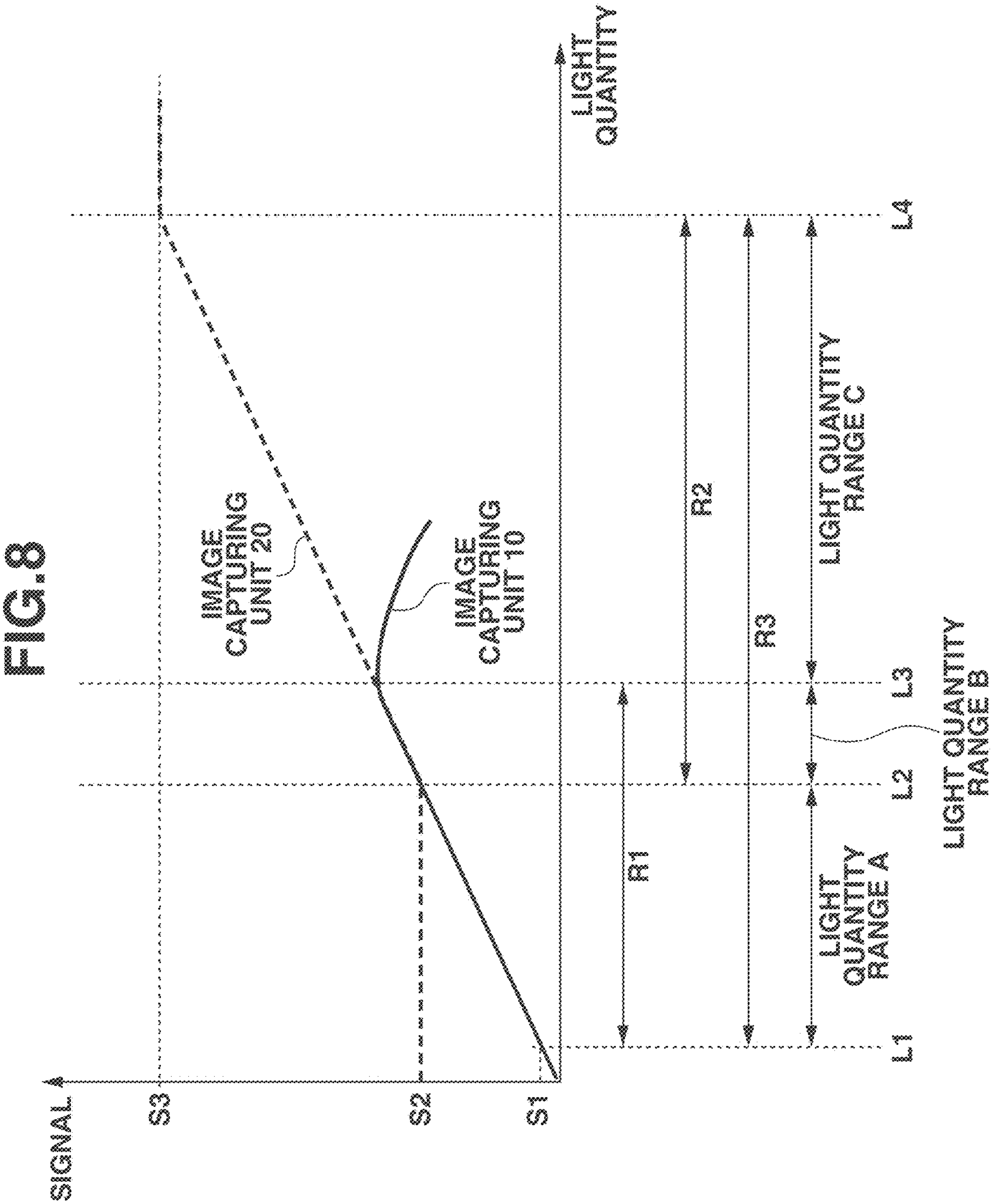
FIG. 8 is a conceptual diagram illustrating image signals output from each image capturing unit in the image capturing and display apparatus according to the second exemplary embodiment.

In the image capturing and display apparatus 100 according to the present exemplary embodiment, image signals acquired by the image capturing unit 10 and the image capturing unit 20, which have different conversion gains and are operated in different operation modes, are processed by the signal processing unit 30, thereby making it possible to display a favorable image on the plurality of display units. FIG. 8 is a conceptual diagram illustrating image signals output from each image capturing unit in the image capturing and display apparatus 100 according to the present exemplary embodiment. A horizontal axis in the conceptual diagram illustrated in FIG. 8 represents the quantity of light incident on the image sensor 300, and a vertical axis in the conceptual diagram illustrated in FIG. 8 represents the magnitude of signals output from the image sensor 300. The image capturing unit 20 supports the light quantity range including a light quantity higher than that in the image capturing unit 10. The image capturing unit 10 supports the light quantity range R1, and the image capturing unit 20 supports the light quantity range R2. The image capturing unit 10 can output signals corresponding to light in the light quantity range R1. The image capturing unit 20 can output signals corresponding to light in the light quantity range R2. The light quantity range R2 includes light quantity values higher than the light quantity range R1. In the present exemplary embodiment, as a method for changing the corresponding light quantity range, different types of image sensors are used for the image capturing unit 10 and the image capturing unit 20, respectively.

The image capturing unit 10 supports a low-brightness image in a range from the light quantity L1 to the light quantity L3. In the image capturing unit 20, a signal with a light quantity smaller than the light quantity L2 is covered with the signal S2, which is a noise signal, so that the signal cannot be read out. On the other hand, a signal corresponding to a light quantity larger than the light quantity L3 can be read out by the image capturing unit 20. The use of the image capturing unit 10 and the image capturing unit 20 each having a configuration described above makes it possible to acquire an image signal corresponding to a wide light quantity range.

An example of image processing performed by the signal processing unit 30 is HDR processing. In the HDR processing, an image signal with a wide dynamic range can be generated using a plurality of image signals acquired under a plurality of image capturing conditions with different light quantity ranges. The light quantity range in which the image capturing unit 10 can acquire image signals corresponds to the light quantity range R1, and the light quantity range in which the image capturing unit 20 can acquire image signals corresponds to the light quantity range R2. By combining a plurality of image signals in different light quantity ranges, an image signal in the light quantity range R3, including the light quantities L1 to L4, can be generated.

While the image capturing unit 10 can obtain an image signal with a high image quality even in a low-illuminance state, a large amount of current flows due to the avalanche amplification, which may lead to an increase in power consumption. Accordingly, for example, signal reading processing is temporarily interrupted in a high-illuminance region in the light quantity range C illustrated in FIG. 8, thereby making it possible to save power. Further, the light quantity range in which the image capturing unit 10 is interrupted may be extended to a part or the whole of the light quantity range B in addition to the light quantity range C.

In the present exemplary embodiment, an SPAD image sensor is used as the image capturing unit 10, but instead any other types of image sensors can be used.

A third exemplary embodiment illustrates a method for operating the image capturing and display apparatus 100. In the image capturing and display apparatus 100 according to the first and second exemplary embodiments, the dynamic range of each image signal to be displayed on the plurality of display units can be extended by the signal processing unit 30. In this case, a brightness that gives a feeling of strangeness to a user can vary among individuals. The image capturing and display apparatus 100 includes the input unit 70 illustrated in FIG. 2. Each user can adjust the brightness by operating the input unit 70. An operation signal output from the input unit 70 is input to the signal processing unit 30, thereby making it possible to adjust the width of the dynamic range used in the signal processing unit 30 within a range in which the image capturing and display apparatus 100 can be appropriately operated. The operation signal output from the input unit 70 enables adjustment of the brightness of each display unit.

An operation on the input unit 70 is performed not only by a button, a switch, a touch panel, or the like, but instead may be performed by a gesture input operation in which a motion of an indicator is detected (moving object detection) based on at least one of the image capturing unit 10 and the image capturing unit 20, and an operation based on the detected motion of the indicator is received. An operation on the input unit 70 can also be performed by an audio input operation in which the input unit 70 includes an audio detection unit and the audio detection unit detects sound. Alternatively, an operation on the input unit 70 can be performed by a line-of-sight input operation in which the input unit 70 includes a line-of-sight detection unit for detecting a line of sight or pupil of the user and a movement of the line of sight is detected, or by a blink input operation in which the number of blinks is detected. Further alternatively, an operation on the input unit 70 can be performed by, for example, an operation for detecting a variation in the size of each pupil of the user, to thereby adjust the brightness of the display image as described above. To prevent an erroneous operation, a combination of a plurality of input methods described above may be used. For example, an operation in which a gesture is performed while a button is pressed, thereby enabling the gesture input operation, can be carried out. By enabling the operation described above, it is possible to provide the image capturing and display apparatus that is suitable for each user and prevents the generation of an image that does not give a feeling of strangeness to each user.

A fourth exemplary embodiment illustrates an example of the display of the image capturing and display apparatus 100. In the image capturing and display apparatus 100 described above, the display units can be arranged corresponding to the right and left eyes, respectively, of the user. When a human sees a certain object, the human sees the object with the right and left eyes that are physically apart from each other, so that a parallax occurs. This parallax enables the user to see a stereoscopic view of an object and to feel a depth relative to another object and a background. Accordingly, if an image signal is displayed on each of a plurality of display units of an HMD or smart glasses, it is difficult for the user to see a stereoscopic view or feel a depth, which may cause a feeling of strangeness. However, according to the image capturing and display apparatus described above, the plurality of image capturing units is arranged at positions that are physically apart from each other, so that images corresponding to the parallax between the both eyes of the user can be acquired by the plurality of image capturing units, and different image signals corresponding to the parallax can be displayed on the plurality of display units, respectively. More specifically, when the distance between the image capturing unit 10 and the display unit 50 is equal to the distance between the image capturing unit 20 and the display unit 60, image signals are generated using the distance between the image capturing unit 10 and the display unit 50, and between the image capturing unit 10 and 20. The distance between the image capturing unit 10 and 20 may be used as so-called parallax information. For example, the distance between the optical center of the image capturing unit 10 and the optical center of the display unit 50 is defined as the distance between the image capturing unit 10 and the display unit 50, and the distance between the optical center of the image capturing unit 10 and 20 is defined as the distance between the image capturing unit 10 and 20.

Figure 9:
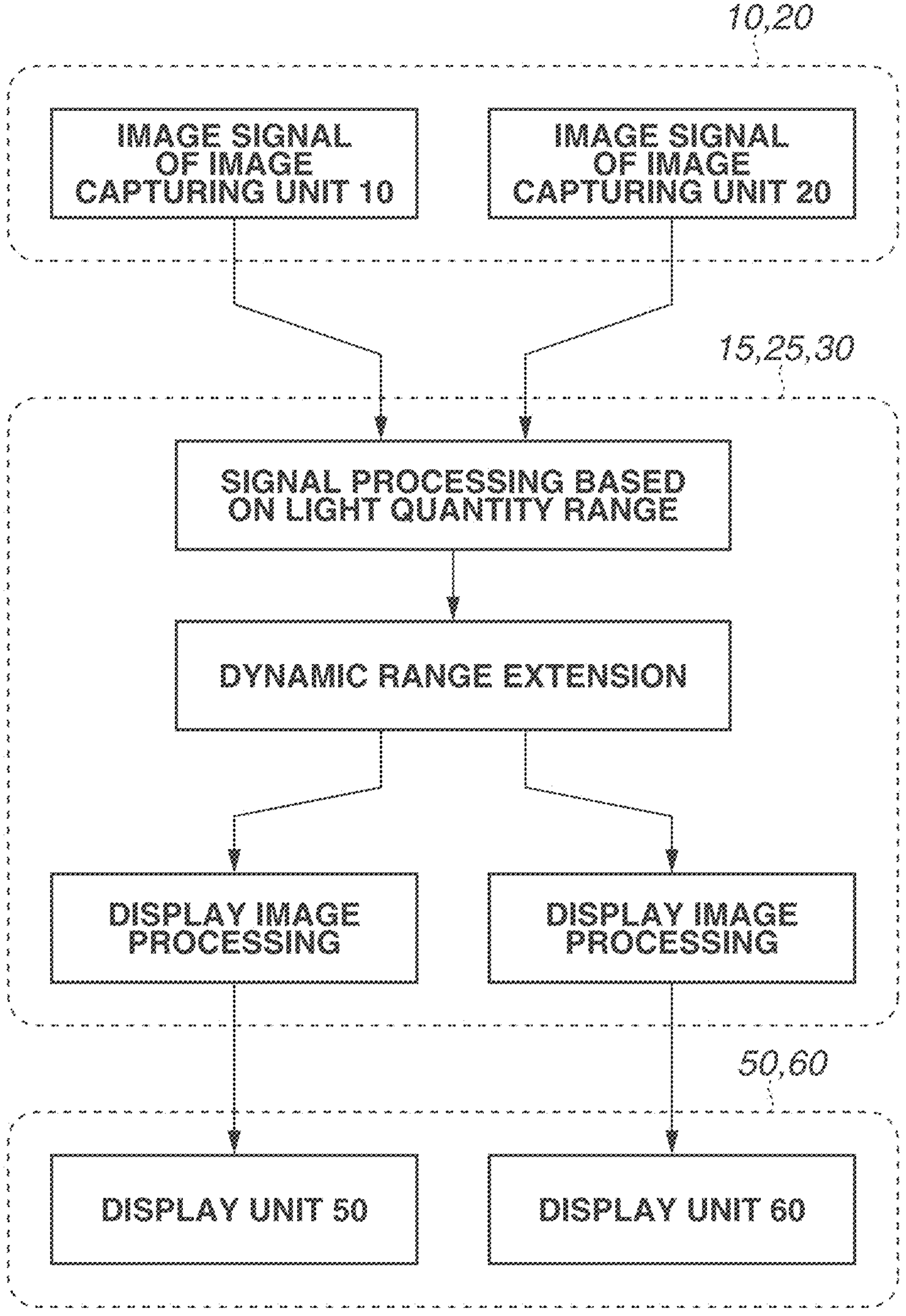
FIG. 9 is a flowchart illustrating an operation performed by an image capturing and display apparatus according to a fourth exemplary embodiment.

FIG. 9 is an operation flowchart illustrating an operation performed by the image capturing and display apparatus 100. First, each of the image capturing unit 10 and the image capturing unit 20 acquires an image signal. Then, the image signals are processed by the image capturing signal processing units 15 and 25 and the signal processing unit 30 illustrated in FIG. 2. Processing, such as correction processing for correcting, for example, a variation in brightness or tint in an output signal in a common light quantity range is performed. Then, the image signals are combined to generate an image signal with an extended dynamic range. Further, the image signal with an extended dynamic range is redistributed based on the above-described parallax information, to generate display images for the display units 50 and 60, respectively.

Like in the light quantity range A and the light quantity range C illustrated in FIG. 4, when only one of the image signals from the plurality of image capturing units is used as the image signal to be displayed on the plurality of display units, the display of the same image signal on the plurality of display units may cause a feeling of strangeness as described above. For this reason, parallax is added in a pseudo manner by using the signal processing unit 30 and different image signals corresponding to the parallax are displayed on the plurality of display units, thereby preventing giving a feeling of strangeness to the user. In the case of adding parallax, parallax information can be obtained based on the image signal that is not in use. To obtain the parallax information, for example, image signals that can be acquired by the plurality of image capturing units, like image signals in the light quantity range B, may be used, and an object may be recognized by the signal processing unit 30 or the like based on deep learning or the like and parallax may be added in a pseudo manner.

In addition to the plurality of image capturing units, a Time-of-Flight (ToF) sensor, a Light Detection and Ranging (LiDAR) sensor, or the like for measuring a distance may be used. The parallax information to be added to the image signals to be displayed on the plurality of display units can be accurately calculated by measuring a distance to a subject, thereby preventing the user from feeling a strangeness. A resolution in an area other than a point at which the user focuses can be decreased by using a line-of-sight detection sensor or the like, thereby making it possible to achieve a more excellent stereoscopic view and the like, to prevent the user from feeling a strangeness, and to save power in the image capturing units and display units.

Figure 10A:
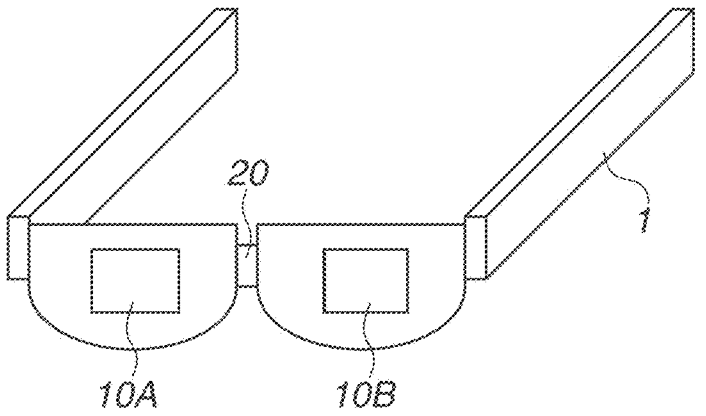
FIG. 10A is an external view illustrating an image capturing and display apparatus according to a fifth exemplary embodiment.

An image capturing and display apparatus according to a fifth exemplary embodiment will be described with reference to FIG. 10A and FIG. 9. In the image capturing and display apparatus according to the present exemplary embodiment, as illustrated in FIG. 10A, an image capturing unit 10A and an image capturing unit 10B are arranged at portions corresponding to right and left lenses, respectively. In addition, another image capturing unit 20 is disposed between the image capturing unit 10A and the image capturing unit 10B. The present exemplary embodiment differs from the first exemplary embodiment in that the image capturing unit 10 according to the first exemplary embodiment is divided into two units and the image capturing unit 20 according to the first exemplary embodiment is arranged between the two units. Descriptions of the contents described in the above exemplary embodiments will be omitted in the following description.

It is desirable to add appropriate parallax information to display images to be displayed on the plurality of display units 50 and 60, respectively, so as to display an image that does not give a feeling of strangeness to the user. However, the exemplary embodiments described above illustrate a method of estimating parallax information between the right and left by using the image capturing unit 10 and the image capturing unit 20 that have different configurations. In this case, since the image capturing units having different configurations are used, a difference in brightness or a variation in color balance in the image capturing result may increase even when the image of the same subject is captured. As a result, the display image may give a feeling of strangeness to the user. Accordingly, as the image capturing units for estimating the parallax information, the image capturing units 10A and 10B having the same configuration are arranged substantially symmetrically at right and left positions as illustrated in FIG. 10A. This configuration makes it possible to suppress variations and prevent a lack of parallax information.

An image signal processing flow according to the present exemplary embodiment is similar to the processing flow illustrated in FIG. 9. More specifically, image signals acquired by the image capturing units 10A, 10B, and 20 and parallax information are processed by the image capturing signal processing units 15 and 25 and the signal processing unit 30, to generate display images corresponding to the display units 50 and 60, respectively. A larger number of image signals can be acquired as compared with the exemplary embodiments described above. Consequently, the accuracy of variation correction processing and parallax information generation processing can be improved and the feeling of strangeness experienced by the user can be further reduced.

Figure 10B:
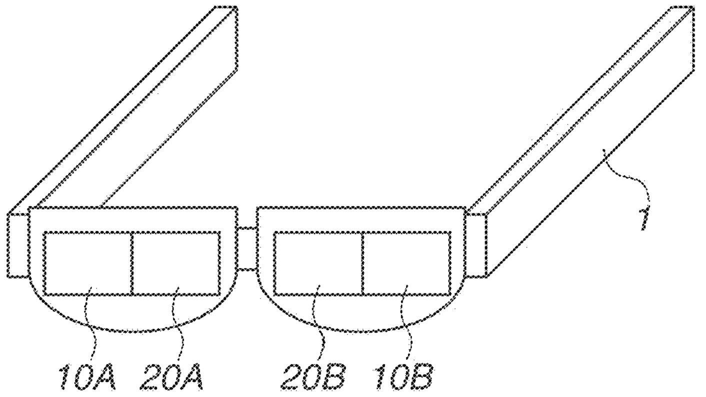
FIG. 10B is an external view illustrating an image capturing and display apparatus according to a sixth exemplary embodiment.

An image capturing and display apparatus according to a sixth exemplary embodiment will be described with reference to FIG. 10B and FIG. 9. In the image capturing and display apparatus according to the present exemplary embodiment, as illustrated in FIG. 10B, one of the lenses is provided with a pair of the image capturing unit 10A and an image capturing unit 20A, and the other one of the lenses is provided with a pair of the image capturing unit 10B and an image capturing unit 20B. The present exemplary embodiment differs from the first exemplary embodiment in that the image capturing unit 10 according to the first exemplary embodiment is divided into two units and the image capturing unit 20 according to the first exemplary embodiment is divided into two units. Descriptions of the contents described in the above exemplary embodiments will be omitted in the following description.

It is desirable to add appropriate parallax information to display images on the plurality of display units 50 and 60, respectively, so as to display an image that does not give a feeling of strangeness to the wearer. Accordingly, like in the fifth exemplary embodiment, in the present exemplary embodiment, the image capturing units 10A and 10B having the same configuration are arranged substantially symmetrically at right and left positions as illustrated in FIG. 10B, and the image capturing units 20A and 20B having the same configuration are arranged substantially symmetrically at right and left positions as illustrated in FIG. 10B. Further, in the present exemplary embodiment, as the image capturing units for estimating the parallax information, at least one of the pair of the image capturing unit 10A and the image capturing unit 10B and the pair of the image capturing unit 20A and the image capturing unit 20B is used. This configuration makes it possible to suppress variations and prevent a lack of parallax information.

An image signal processing flow according to the present exemplary embodiment is similar to the processing flow illustrated in FIG. 9. More specifically, image signals acquired by the image capturing units 10A, 10B, 20A, and 20B are processed by the image capturing signal processing units 15 and 25 and the signal processing unit 30, thereby generating display images for the display units 50 and 60, respectively. A larger number of image signals can be acquired as compared with the exemplary embodiments described above. Consequently, the accuracy of variation correction processing and parallax information generation processing can be improved and the feeling of strangeness experienced by the user can be further reduced.

Referring to FIG. 10B, the image capturing unit 10A and the image capturing unit 20A are arranged at different positions on a plane, and the image capturing unit 10B and the image capturing unit 20B are arranged at different positions on a plane. However, the image capturing units in the pair of the image capturing unit 10A and the image capturing unit 20A or the pair of the image capturing unit 10B and the image capturing unit 20B can also be formed within, for example, a chip with respect to a common optical system. In other words, the image capturing unit 10A and the image capturing unit 20A may be arranged in a stacked manner within the same chip, or may be arranged by combining the image capturing unit 10A and the image capturing unit 20A in a checkered pattern or the like. The image capturing unit 10B and the image capturing unit 20B may be arranged in a stacked manner within the same chip, or may be arranged by combining the image capturing unit 10B and the image capturing unit 20B in a checkered pattern or the like.

Figure 10C:
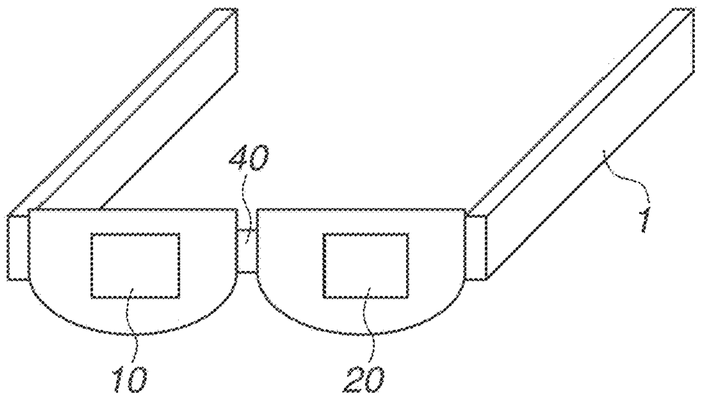
FIG. 10C is an external view illustrating an image capturing and display apparatus according to a seventh exemplary embodiment.

An image capturing and display apparatus according to a seventh exemplary embodiment will be described with reference to FIG. 10C and FIG. 11. In the image capturing and display apparatus according to the present exemplary embodiment, as illustrated in FIG. 10C, one of the lenses is provided with the image capturing unit 10, the other one of the lenses is provided with the image capturing unit 20, and a ranging optical system 40 is disposed therebetween. The present exemplary embodiment differs from the first exemplary embodiment in that the ranging optical system 40 is provided between the image capturing unit 10 and the image capturing unit 20 according to the first exemplary embodiment. Descriptions of the contents described in the above exemplary embodiments will be omitted in the following description.

The image capturing and display apparatus according to the seventh exemplary embodiment will be described with reference to FIG. 10C and FIG. 11. The image capturing and display apparatus according to the present exemplary embodiment differs from the first exemplary embodiment in that the ranging optical system 40 is added. Descriptions of the contents described in the above exemplary embodiments will be omitted in the following description.

As described above, it is desirable to add appropriate parallax information to display images on the plurality of display units 50 and 60, respectively, so as to display an image that does not give a feeling of strangeness to the wearer. However, the exemplary embodiments described above illustrate a method of estimating parallax information on the right and left lenses by deep learning or the like from an image signal and a distance to a subject. This may lead to an erroneous result that is different from actual distance information, or may cause a deterioration in accuracy. Therefore, the distance information is accurately measured by providing the ranging optical system 40 as illustrated in FIG. 10C. With this configuration, the accuracy of parallax information for redistributing image signals to the display units 50 and 60 can be enhanced.

As the ranging optical system 40, for example, a sensor module for autofocusing can be used. Alternatively, a laser light source for emitting semiconductor laser can be arranged in the ranging optical system 40, and at least one of the image capturing units 10 and 20 can measure a distance by a Time-of-Flight method (hereinafter referred to as a ToF method) or the like. In addition, a technique called imaging plane phase difference autofocus can be introduced for pixels of the image capturing units 10 and 20, and the technique can be used in combination with phase difference information acquired by the image capturing units 10 and 20.

Figure 11:
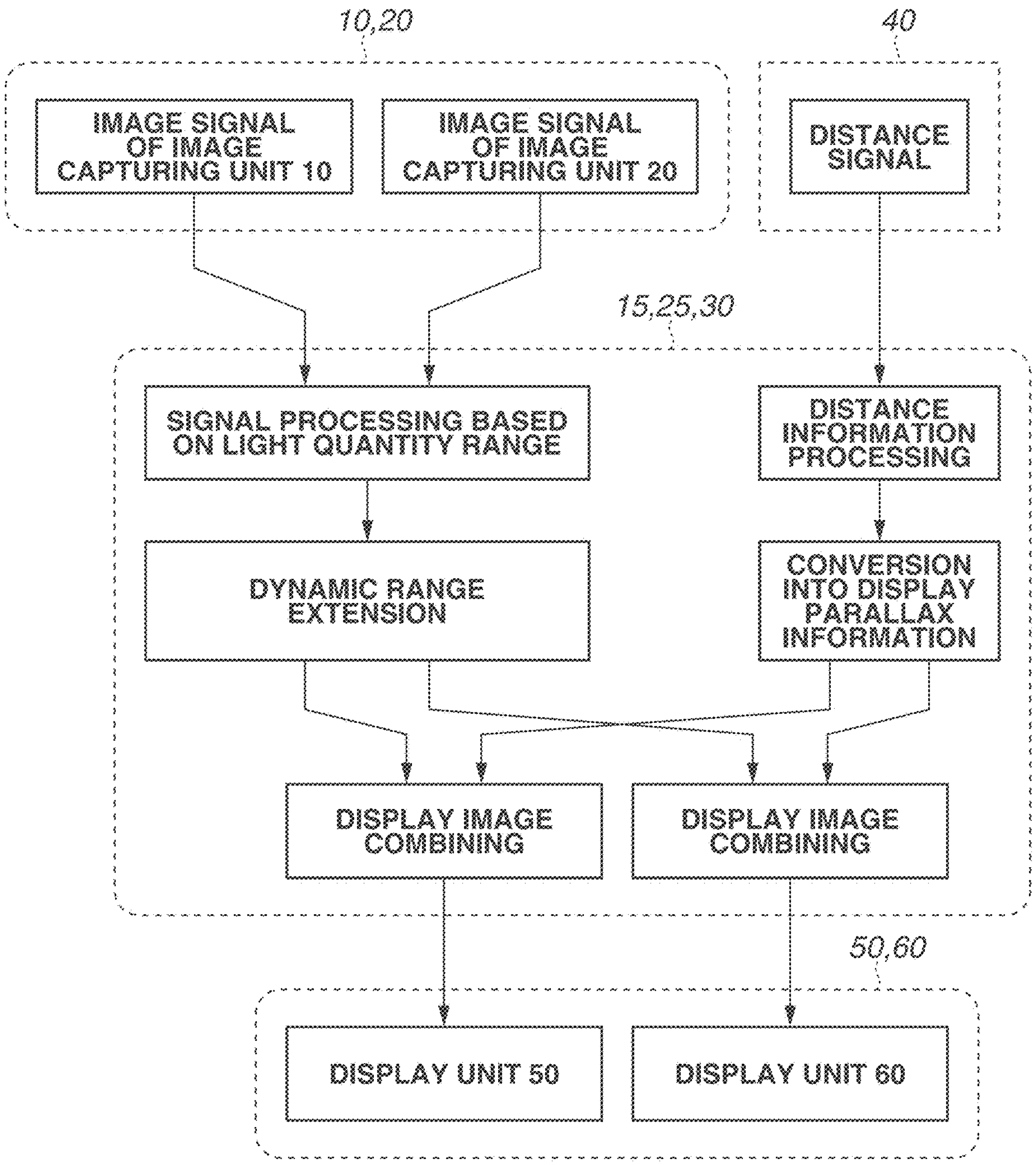
FIG. 11 is a flowchart illustrating an operation performed by the image capturing and display apparatus according to the seventh exemplary embodiment.

FIG. 11 illustrates an image signal processing flow according to the present exemplary embodiment. Each of the image capturing unit 10 and the image capturing unit 20 acquires an image signal. Then, the image signals are subjected to processing that is performed in other exemplary embodiments by the image capturing signal processing units 15 and 25 and the signal processing unit 30. In this way, image information is generated. In parallel to this processing, the signal obtained from the ranging optical system 40 is processed by the signal processing unit 30 to generate distance information. The ranging optical system 40 can acquire a ranging signal, i.e., a distance signal. Parallax information for display is further generated by using the distance information. The signal processing unit 30 performs redistribution processing for the display units 50 and 60 based on the image information and parallax information for display, thereby generating display images. Since the distance information can be acquired with a higher accuracy than in the exemplary embodiments described above, the accuracy of variation correction processing and parallax information generation processing can be further improved and the feeling of strangeness experienced by the user can be reduced.

In the present exemplary embodiment, the parallax information is acquired with a higher accuracy, thereby making it possible to provide a display image that can reduce the feeling of strangeness given to the user.

Figure 10D:
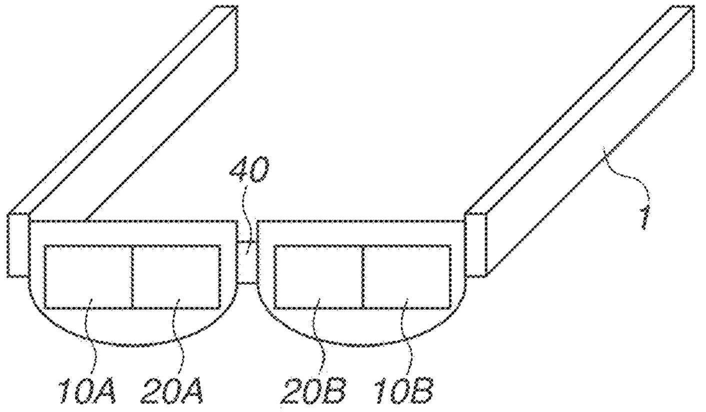
FIG. 10D is an external view illustrating an image capturing and display apparatus according to an eighth exemplary embodiment.

An image capturing and display apparatus according to an eighth exemplary embodiment will be described with reference to FIG. 10D and FIG. 12. In the image capturing and display apparatus according to the present exemplary embodiment, as illustrated in FIG. 10D, one of the lenses is provided with a pair of the image capturing unit 10A and the image capturing unit 20A, and the other one of the lenses is provided with a pair of the image capturing unit 10B and the image capturing unit 20B. In the image capturing and display apparatus according to the present exemplary embodiment, the ranging optical system 40 is provided between the two lenses. The present exemplary embodiment differs from the first exemplary embodiment in that the image capturing unit 10 according to the first exemplary embodiment is divided into two units, the image capturing unit 20 according to the first exemplary embodiment is divided into two units, and the ranging optical system 40 is provided. Descriptions of the contents described in the above exemplary embodiments will be omitted in the following description.

The ranging optical system 40 according to the present exemplary embodiment is, for example, a laser light source for emitting a semiconductor laser. Then, at least one of the image capturing unit 10 and the image capturing unit 20 measures a distance using the ToF method or the like. A technique called an imaging plane phase difference method can also be introduced into pixels of the image capturing unit 10A or the image capturing unit 20B. The imaging plane phase difference method is also referred to as imaging plane phase difference autofocus. In the present exemplary embodiment, a combination of phase difference information acquired by the ToF method and phase difference information acquired by the imaging plane phase difference method is used. For example, an SPAD sensor is used as the image capturing unit 10 and distance information is acquired by the image capturing unit 10 using the ToF method. Further, a CMOS sensor is used as the image capturing unit 20 and distance information is acquired by the image capturing unit 20 using the imaging plane phase difference method. Compared to the exemplary embodiments described above, in the present exemplary embodiment, distance information can be acquired by the image capturing units arranged at the right and left positions, and thus more accurate parallax information can be acquired. Consequently, the configuration according to the present exemplary embodiment makes it possible to generate a display image to which accurate parallax information is added.

Figure 12:
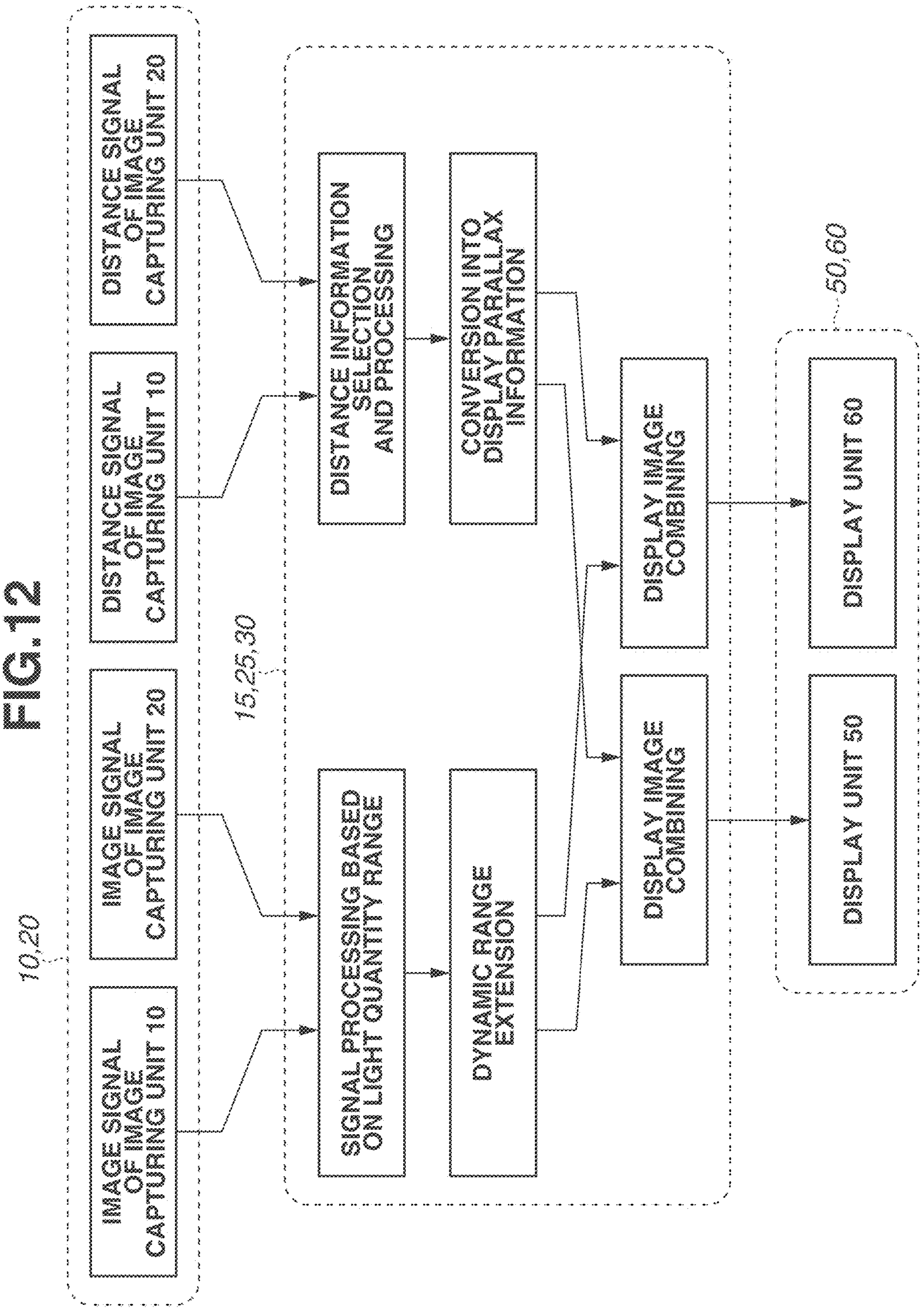
FIG. 12 is a flowchart illustrating an operation performed by the image capturing and display apparatus according to the eighth exemplary embodiment.

FIG. 12 illustrates an image signal flow according to the present exemplary embodiment. Each of the image capturing unit 10 and the image capturing unit 20 acquires an image signal. Then, each of the image capturing unit 10 and the image capturing unit 20 acquires a distance signal. The image signals are subjected to processing that is performed in other exemplary embodiments by the image capturing signal processing units 15 and 25 and the signal processing unit 30. Thus, image information is generated. In parallel to this processing, the distance signals are processed by the image capturing signal processing units 15 and 25 and the signal processing unit 30, to generate distance information. Parallax information for display is further generated using the distance information. The signal processing unit 30 performs redistribution processing for the display units 50 and 60 based on the image information and display parallax information, to generate a display image. Since distance information with a higher accuracy than in the exemplary embodiments described above can be obtained, the accuracy of variation correction processing and parallax information generation processing can be further improved. Consequently, it is possible to provide a display image that can further reduce a feeling of strangeness given to the user.

It is desirable to correct distance information, as needed, because there is a possibility that a misalignment may be included in the arrange of image capturing units and display units, or that the user may be wearing the device in a tilted manner. Further, it is desirable that parallax information can be adjusted, as needed, because the degree at which users feel strangeness varies among individuals.

According to the exemplary embodiments described above, it is possible to provide an image capturing and display apparatus capable of displaying a favorable image supporting a wide brightness range in the outside world. The exemplary embodiments described above illustrate the image capturing and display apparatus including two image capturing units and two display units. However, the image capturing and display apparatus may include three or more image capturing units and three or more display units. In a case where the image capturing and display apparatus includes three or more image capturing units, for example, a display image including a stereoscopic view can be generated. While the exemplary embodiments described above illustrate an example where visible light is used, the exemplary embodiments are also applicable to a case of light with any wavelength. While the exemplary embodiments described above illustrate an example where two or less image capturing units that are provided at right and left positions are used, three or more image capturing units may be used. The number of image capturing units may be determined depending on a load to be applied to the signal processing.

While the present disclosure has been described with reference to exemplary embodiments, the scope of the following claims are to be accorded the broadest interpretation so as to encompass all such modifications and equivalent structures and functions.

What is claimed is:

1. A display apparatus comprising:

a first sensor unit including an avalanche photodiode and configured to acquire a first signal related to a signal from the avalanche photodiode;

a second sensor unit including a photodiode and a transistor configured to output a signal based on electric charge from the photodiode, and configured to acquire a second signal related to the signal from the photodiode;

a processing unit including a signal processing circuit electrically connected to the first sensor unit and the second sensor unit; and a display unit configured to display information based on at least the third signal supplied from the processing unit;

wherein the signal processing circuit, is configured to generate information based on a signal acquired by the first sensor unit in a first dynamic range and a signal acquired by the second sensor unit in a second dynamic range, and wherein a maximum value of the second dynamic range is larger than a maximum value of the first dynamic range.

2. The display apparatus according to claim 1, wherein the first sensor unit is disposed on a side of a first face of the display, and the display unit is disposed on a side of a second face of the display.

3. The display apparatus according to claim 1, wherein, in a case where a user wears the display apparatus, a distance between the first sensor unit and eyes of the user is longer than a distance between the display unit and the eyes of the user.

4. The display apparatus according to claim 1, wherein, in a case where a user wears the display apparatus, the display unit is arranged corresponding to an eye of the user.

5. The display according to claim 1, further comprising a light source including a semiconductor laser; and wherein the light source and the processing unit are configured to measure a distance by a Time-of-Flight method.

6. The display according to claim 1, wherein the first sensor unit is disposed on a side of a first face of the display apparatus, and the display unit and the second sensor unit are disposed on a side of a second face of the display apparatus.

7. The display apparatus according to claim 1, wherein the second sensor unit is configured to perform a global shutter operation.

8. The display apparatus according to claim 1, wherein the second sensor unit includes color filters.

9. The display apparatus according to claim 1, wherein the first sensor unit and the second sensor unit are arranged in a checkered pattern.

10. The display apparatus according to claim 1, wherein the processing unit is configured to perform dynamic range expansion processing.

11. The display apparatus according to claim 1, wherein the second sensor unit includes an element configured to switch a capacitance of an input node.

12. The display apparatus according to claim 1, wherein the second sensor unit includes an amplifier configured to amplify a signal from the photodiode and having a first gain and a second gain higher than the first gain.

13. The display apparatus according to claim 1, further comprising a light source including a semiconductor laser, wherein the processing unit is configured to measure a distance by a Time-of-Flight method.

14. The display apparatus according to claim 1, wherein the second sensor unit has a plurality of photodiodes configured to measure a distance by a phase difference autofocus.

15. The display apparatus according to claim 1, wherein the processing unit performs at least one of generation of the third signal and adjustment of a brightness of the display unit by detecting a moving object based on at least one of the first signal and the second signal.

16. The display apparatus according to claim 1, further comprising an input unit electrically connected to the processing unit, and including at least one of an audio detection unit and a line-of-sight detection unit and configured to output an operation signal to the processing unit.

17. The display apparatus according to claim 1, further comprising another display unit, wherein the processing unit generates the third signal for the display unit and the another display unit based on a distance signal from each of the first sensor unit and the second sensor unit.

18. The display apparatus according to claim 1, wherein the first sensor unit includes a counter configured to perform counting based on the signal from the avalanche photodiode.

19. The display apparatus according to claim 6, wherein the second sensor unit is configured to perform a global shutter operation.

20. The display apparatus according to claim 1, further comprising a third sensor unit including an avalanche photodiode, and a fourth sensor unit including a photodiode and a transistor, wherein the first sensor unit, the second sensor unit, the fourth sensor unit, and the third sensor unit are arranged in this order.

21. The display apparatus according to claim 1, wherein the first dynamic range and the second dynamic range include an overlapping region which is overlapping the first dynamic region and the second dynamic region.

22. The display apparatus according to claim 21, wherein a white balance for the image is adjusted based on signals in the overlapping region.

23. A display apparatus comprising:

a first sensor unit including an avalanche photodiode and configured to acquire a first signal related to a signal from the avalanche photodiode;

a second sensor unit including a photodiode and a transistor configured to output a signal based on electric charge from the photodiode, and configured to acquire a second signal related to the signal from the photodiode;

a processing unit including a signal processing circuit and a signal holding circuit, and configured to generate at least a third signal based on the first signal and the second signal;

a display unit configured to display information based on at least the third signal supplied from the processing unit;

an input unit electrically connected to the signal processing circuit and configured to output an operation signal to the signal processing unit, wherein the input unit includes at least one selected from the group consisting of an audio detection unit and a line-of-sight detection unit.

24. A display apparatus comprising:

a first sensor unit including an avalanche photodiode and configured to acquire a first signal related to a signal from the avalanche photodiode;

a second sensor unit including a photodiode and a transistor configured to output a signal based on electric charge from the photodiode, and configured to acquire a second signal related to the signal from the photodiode;

a processing unit configured to generate at least a third signal based on the first signal and the second signal;

a display unit configured to display information based on at least the third signal supplied from the processing unit, wherein a dynamic range of the first signal and a dynamic range of the second signal include an overlapping region.

* * * * *